(12) United States Patent
Hahm

(10) Patent No.: US 9,800,919 B2
(45) Date of Patent: Oct. 24, 2017

(54) METHOD AND DEVICE FOR SCREEN MIRRORING

(71) Applicant: Samsung Electronics Co., Ltd., Suwon-si, Gyeonggi-do (KR)

(72) Inventor: Seong-il Hahm, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/587,450

(22) Filed: Dec. 31, 2014

(65) Prior Publication Data

US 2015/0195601 A1    Jul. 9, 2015

(30) Foreign Application Priority Data

Jan. 8, 2014 (KR) .................. 10-2014-0002501

(51) Int. Cl.
*H04N 21/41* (2011.01)
*H04N 21/472* (2011.01)
*H04N 21/485* (2011.01)
*H04N 21/414* (2011.01)
*H04N 21/435* (2011.01)
*H04N 21/239* (2011.01)
*H04N 21/43* (2011.01)
*H04N 21/2383* (2011.01)
(Continued)

(52) U.S. Cl.
CPC ....... *H04N 21/4122* (2013.01); *G06F 3/1462* (2013.01); *H04N 21/2383* (2013.01); *H04N 21/2393* (2013.01); *H04N 21/4126* (2013.01); *H04N 21/41407* (2013.01); *H04N 21/435* (2013.01); *H04N 21/4307* (2013.01); *H04N 21/43615* (2013.01); *H04N 21/43637* (2013.01); *H04N 21/47202* (2013.01); *H04N 21/4858* (2013.01); *H04N 21/6587* (2013.01); *G09G 5/14* (2013.01); *G09G 2340/04* (2013.01); *G09G 2352/00* (2013.01)

(58) Field of Classification Search
CPC ......... H04N 21/26258; H04N 21/4126; H04N 21/42204; H04N 21/42208; H04N 21/4316; H04N 21/4333; H04N 7/0122
See application file for complete search history.

(56) References Cited

U.S. PATENT DOCUMENTS

2006/0044741 A1    3/2006  Bussan
2012/0313968 A1*  12/2012  Yoshioka .............. G06F 3/1454
                                                    345/629
(Continued)

*Primary Examiner* — Pankaj Kumar
*Assistant Examiner* — Alazar Tilahun
(74) *Attorney, Agent, or Firm* — Jefferson IP Law, LLP

(57) ABSTRACT

A method of reproducing a streaming video received from a source device is provided. The method including reproducing, by a sync device, a first streaming video representing an image on a screen of the source device, the first streaming video being reproduced using a full screen player, when a partial area of the image on the screen of the source device changes, receiving, from the source device, a second streaming video including change information about the partial area, determining a partial screen player to reproduce the second streaming video, and reproducing the second streaming video in an area of a screen of the sync device which corresponds to the partial area of the image on the screen of the source device, the second streaming video being reproduced using the partial screen player.

18 Claims, 10 Drawing Sheets

(51) Int. Cl.
   *H04N 21/6587* (2011.01)
   *G06F 3/14* (2006.01)
   *H04N 21/436* (2011.01)
   *H04N 21/4363* (2011.01)
   *G09G 5/14* (2006.01)

(56) References Cited

U.S. PATENT DOCUMENTS

2013/0128948 A1   5/2013   Rabii et al.
2013/0138728 A1   5/2013   Kim et al.
2013/0148720 A1*  6/2013   Rabii .................... G06F 3/1454
                                                       375/240.12
2013/0219072 A1   8/2013   Han et al.
2014/0223490 A1*  8/2014   Pan .................. H04N 21/42224
                                                       725/61

* cited by examiner

METHOD AND DEVICE FOR SCREEN MIRRORING

CROSS-REFERENCE TO RELATED APPLICATION(S)

This application claims the benefit under 35 U.S.C. §119(a) of a Korean patent application filed on Jan. 8, 2014 in the Korean Intellectual Property Office and assigned Serial number 10-2014-0002501, the entire disclosure of which is hereby incorporated by reference.

TECHNICAL FIELD

The present disclosure relates to a method and device for mirroring an image on a screen. More particularly, the present disclosure relates to a method and device for mirroring a streaming video on a sync device that is received from a source device.

BACKGROUND

Mirroring technology enables a user to share and manipulate data that is output on screens of a plurality of devices. For example, by using mirroring technology, the user may reproduce a movie via a tablet PC and may simultaneously reproduce the movie via a TV in a living room.

In general, mirroring technology may be implemented in a manner that a source device encodes images on a screen of the source device and then streams the images to a sync device. However, regardless of whether the images on the screen of the source device change and regardless of a size of a changed display area of the source device, the source device periodically encodes all images on an entire screen of the source device and transmits the images to the sync device. This periodic encoding of all of the images on the entire screen of the source device results in an unnecessarily high use of resources of the source device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for mirroring a changed image on a screen.

Additional aspects will be set forth, in part, in the description which follows and, in part, will be apparent from the description, or may be learned by practice of the presented embodiments.

In accordance with an aspect of the present disclosure, a method of reproducing a streaming video received from a source device is provided. The method includes reproducing, by a sync device, a first streaming video representing an image on a screen of the source device, the first streaming video being reproduced using a full screen player, when a partial area of the image on the screen of the source device changes, receiving, from the source device, a second streaming video including change information about the partial area, determining a partial screen player to reproduce the second streaming video, and reproducing the second streaming video in an area of a screen of the sync device which corresponds to the partial area of the image on the screen of the source device, the second streaming video being reproduced using the partial screen player.

In accordance with another aspect of the present disclosure, a method of transmitting a streaming video to a sync device is provided. The method includes transmitting, by a source device, a first streaming video representing an image displayed on a screen of the source device, the first streaming video being transmitted to the sync device, determining whether a partial area of the image displayed on the screen of the source device has changed, extracting change information about the changed partial area, encoding the partial area of the image into a second streaming video, based on the change information, and transmitting the second streaming video to the sync device.

In accordance with another aspect of the present disclosure, a sync device for reproducing a streaming video received from a source device is provided. The sync device includes a reproducing unit configured to reproduce a first streaming video representing an image on a screen of the source device, the first streaming video being reproduced using a full screen player, a communication unit configured to, when a partial area of the image on the screen of the source device changes, receive, from the source device, a second streaming video including change information about the partial area, and a control unit configured to determine a partial screen player to reproduce the second streaming video, wherein the reproducing unit is further configured to reproduce the second streaming video in an area of a screen of the sync device which corresponds to the partial area of the image on the screen of the source device, the second streaming video being reproduced using the partial screen player.

In accordance with another aspect of the present disclosure, a source device for transmitting a streaming video to a sync device is provided. The source device includes a data communication unit configured to transmit a first streaming video representing an image displayed on a screen of the source device, the first streaming video being transmitted to the sync device, a control unit configured to determine whether a partial area of the image displayed on the screen of the source device has changed and to extract change information about the changed partial area, and an encoding unit configured to encode the partial area of the image into a second streaming video, based on the change information, wherein the data communication unit is further configured to transmit the second streaming video to the sync device.

In accordance with another aspect of the present disclosure, a non-transitory computer-readable recording medium is provided. The non-transitory computer-readable recording medium includes a program recorded thereon, the program causing a computer to execute a method including reproducing, by a sync device, a first streaming video representing an image on a screen of the source device, the first streaming video being reproduced using a full screen player, when a partial area of the image on the screen of the source device changes, receiving, from the source device, a second streaming video including change information about the partial area, determining a partial screen player to reproduce the second streaming video, and reproducing the second streaming video in an area of a screen of the sync device which corresponds to the partial area of the image on the screen of the source device, the second streaming video being reproduced using the partial screen player.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
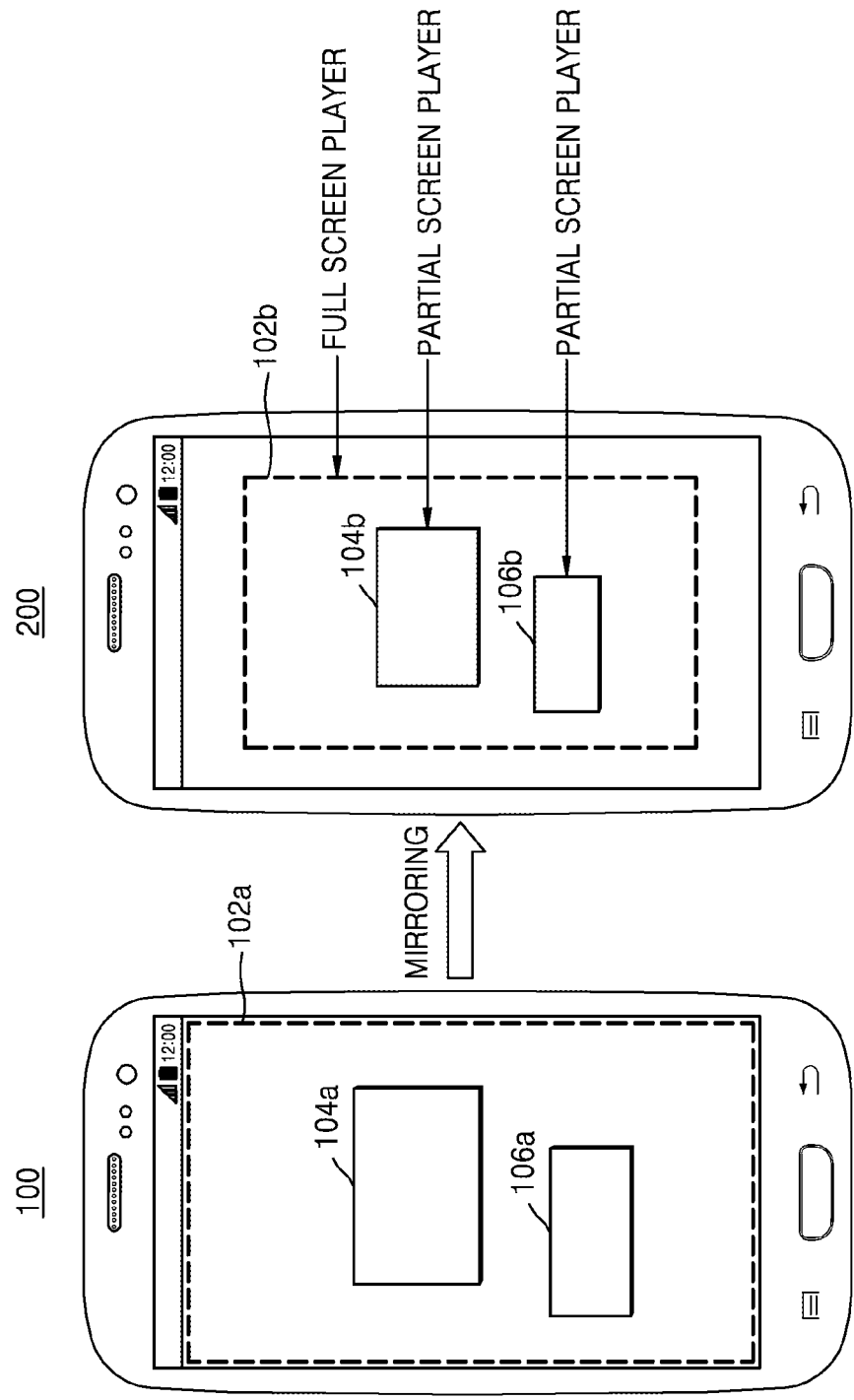
FIG. 1 illustrates an example in which, when some areas are changed on a screen of a source device, the changed areas are mirrored to a sync device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

One or more embodiments of the present disclosure will now be described more fully with reference to the accompanying drawings, in which embodiments of the disclosure are shown. The one or more embodiments of the present disclosure may, however, be embodied in many different forms and should not be construed as being limited to the embodiments set forth herein. Rather, these embodiments are provided so that this disclosure will be thorough and complete, and will fully convey the concept of the disclosure to those of ordinary skill in the art. In the following description, well-known functions or constructions are not described in detail since they would obscure the disclosure with unnecessary detail. Throughout the specification, like reference numerals in the drawings denote like elements.

Reference will now be made in detail to embodiments, examples of which are illustrated in the accompanying drawings. Specifically, FIGS. 1 through 10, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element Expressions such as "at least one of," when preceding a list of elements, modify the entire list of elements and do not modify the individual elements of the list.

FIG. 1 illustrates an example in which, when some areas are changed on a screen of a source device, the changed areas are mirrored to a sync device according to an embodiment of the present disclosure.

Referring to FIG. 1, a source device 100 may transmit, to a sync device 200, data of changed areas 104a and 106a, from among an image 102a, which are displayed on a screen of the source device 100.

The source device 100 may determine whether a partial area of an image that is displayed on the screen of the source device 100 has changed.

An image may be an image which is able to be updated on the screen of the source device 100. In this case, the source device 100 may determine that a partial area of the image has changed. Also, the source device 100 may extract coordinate information and pixel information about the partial area of the image. Also, the source device 100 may encode the partial area of the image into a video so as to control the partial area of the image to be included in one frame and may stream the encoded video to a sync device 200.

Also, an image may be an image including all unit images on an entire screen of the source device 100. For example, data comprising an image may be data of screen buffer of the source device 100. Accordingly, the source device 100 may determine whether at least one image, of all the images that are displayed on the screen of the source device 100, has changed. Also, the source device 100 may extract coordinate information and pixel information about an area of the changed image. Also, the source device 100 may encode image information about the changed image into a video so as to control the changed image to be included in one frame and may stream the encoded video to the sync device 200.

When the source device 100 transmits a video about an image 102a on the screen to the sync device 200, the source device 100 may encode the changed areas 104a and 106a of the image 102a into a separate video and may transmit the separate video to the sync device 200.

The sync device 200 may receive the data of the changed areas, from among an image 102a, that are displayed on the screen and may reproduce the video regarding the changed areas.

While the sync device 200 reproduces an image 102b indicating/representing an image 102a that is displayed on the screen of the source device 100, the sync device 200 may receive images 104b and 106b indicating/representing the changed areas 104a and 106a of the image 102a from the source device 100, and thus may reproduce the images 104b and 106b on areas of a screen of the sync device 200 which correspond to the changed areas.

The sync device 200 may control players in the sync device 200. The sync device 200 may control a full screen player that reproduces the image 102b indicating/representing the image 102a that is displayed on the screen of the source device 100, and partial screen players that reproduce the images 104b and 106b indicating/representing the changed areas 104a and 106a of the image 102a. Also, the sync device 200 may receive control information about the players from the source device 100, and thus may control the players based on the control information.

An image displayed on the screen of the source device 100 may include all types of information such as an icon, a video, text, etc. that may be displayed on the screen of the source device 100 and thus may be shown to a user.

Each of the source device 100 and the sync device 200 may include, but is not limited to, a mobile phone, a smartphone, a laptop computer, a tablet personal computer (PC), an electronic book terminal, a terminal for digital broadcasting, a personal digital assistant (PDA), a portable multimedia player (PMP), an MP3 player, a digital camera, a navigation device, or the like.

Figure 2:
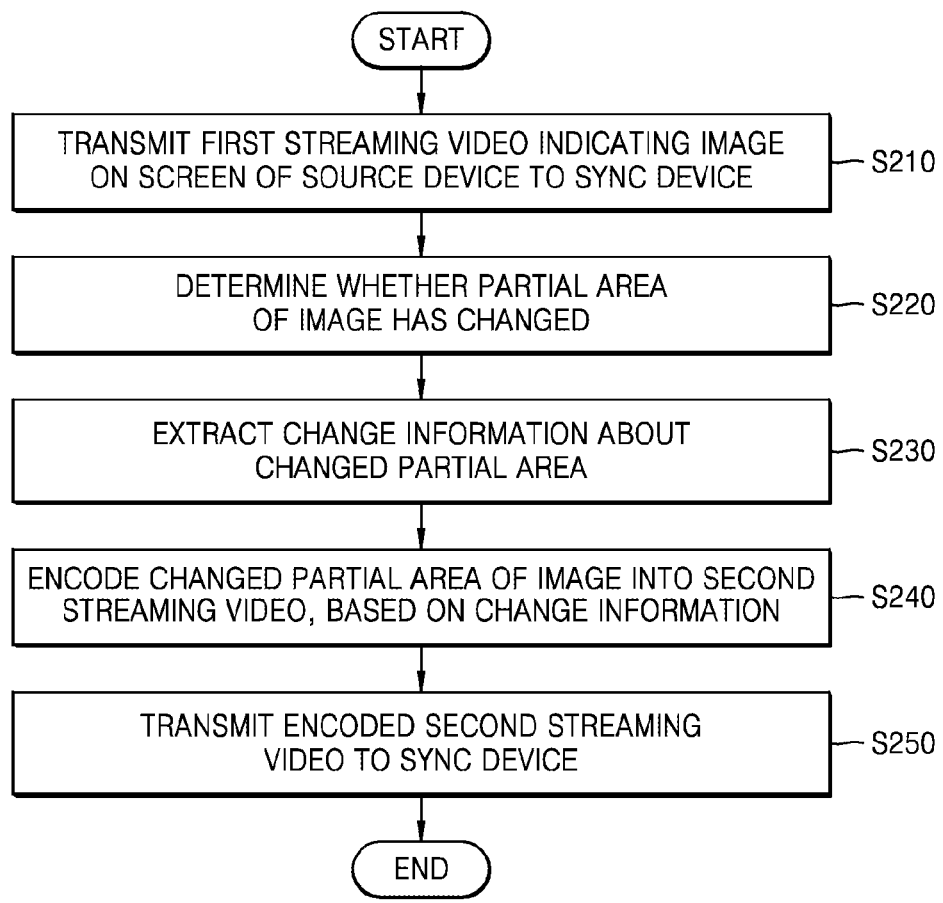
FIG. 2 is a flowchart of a method of extracting a changed image from among all images displayed on a screen of a source device and mirroring the changed area of the image to a sync device according to an embodiment of the present disclosure.

FIG. 2 is a flowchart of a method of extracting a changed area from among all images displayed on a screen of a source device and mirroring the changed area of the image to a sync device according to an embodiment of the present disclosure.

Referring to FIG. 2, in operation S210, the source device 100 of FIG. 1 may transmit a first streaming video indicating/representing an image on a screen of the source device 100 to the sync device 200 of FIG. 1.

The source device 100 may encode the image into the first streaming video so that the image displayed on the screen may be included in one frame. The image may be an image representing the entire area of the screen. For example, the image may be an image including all images on the screen of the source device 100. Then, the source device 100 may transmit the first streaming video to the sync device 200. The source device 100 may encode the image displayed on the screen into a video by a regular time interval and may transmit the video to the sync device 200.

In operation S220, the source device 100 may determine whether a partial area from among the image on the screen of the source device 100 has changed.

The source device 100 may compare the image displayed on the screen with a previous image, and thus may determine whether a partial area of the image has changed. For example, the source device 100 may periodically check pixel values of the image displayed on the screen, and if the pixel values have changed, then the source device 100 may determine that a partial area of the image has changed.

Also, when an event occurs so that the image to be displayed on the screen is updated, the source device 100 may determine that a partial area of the image has changed.

In operation S230, the source device 100 may extract change information about the changed partial area.

The source device 100 may extract a coordinate value of a changed area in which a pixel value has changed. For example, the source device 100 may extract the image displayed on the entire screen, may compare the image with a previously extracted image, and thus may extract the coordinate value of the changed area in which the pixel value has changed. For example, when at least one unit image has been updated on an area in which the image is displayed, the source device 100 may determine the coordinate value of the updated area.

Also, the source device 100 may determine a transmission area including the changed area. The transmission area may indicate/represent an area from among the area in which the image is displayed on the screen of the source device 100, which is to be transmitted to the sync device 200. A method of determining the transmission area including the changed area will be described with reference to FIG. 3.

Figure 3:
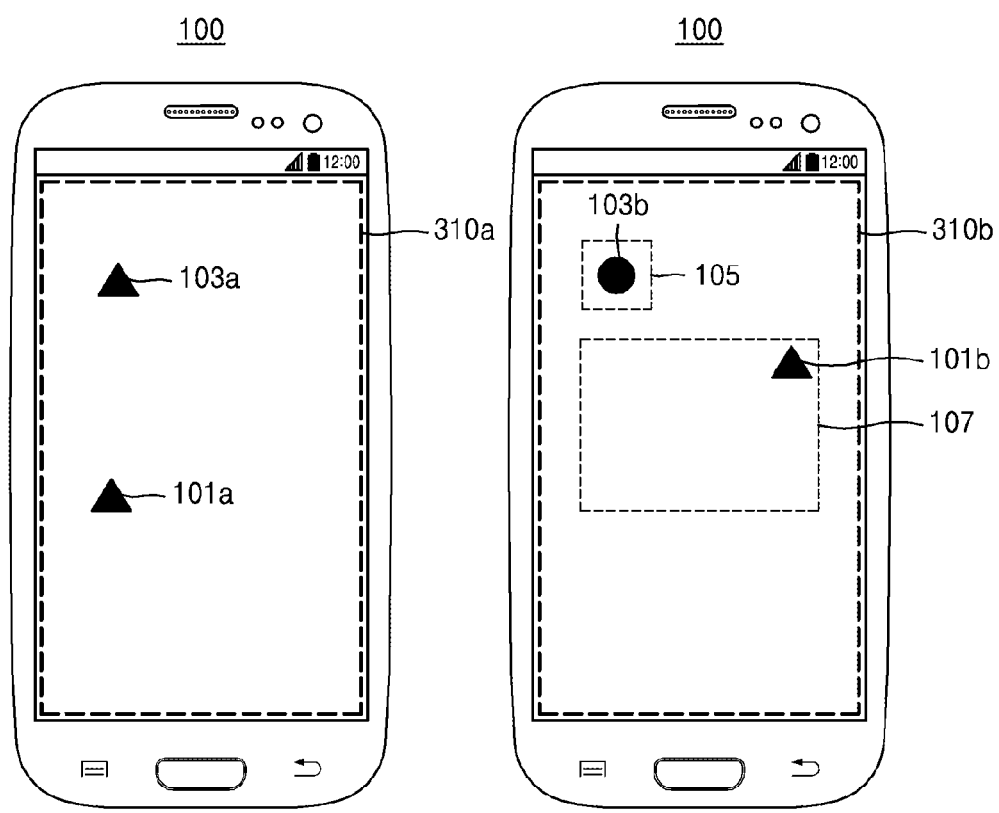
FIG. 3 illustrates an example in which a transmission area is determined on a screen of a source device according to an embodiment of the present disclosure.

FIG. 3 illustrates an example in which a transmission area is determined on a screen of a source device according to an embodiment of the present disclosure.

Referring to FIG. 3, a source device 100 may extract a full screen image 310b displayed on the screen of the source device 100, may compare the full screen image 310b with a previously extracted full screen image 310a, and thus may extract a coordinate value of an area in which a pixel value has changed.

When the full screen image 310a displayed on the screen of the source device 100 at a specific time includes a triangular FIG. 101a, and when the triangular FIG. 101a moves in an upper right direction, the source device 100 may determine, as a transmission area 107, an area of the triangular FIG. 101a that is displayed at the specific time and an area of the triangular FIG. 101b that has moved after a predetermined time.

Also, when the full screen image 310a displayed on the screen of the source device 100 at a specific time includes a triangular FIG. 103a, and when the triangular FIG. 103a changes to a circular FIG. 103b after a predetermined time, the source device 100 may determine an area including the circular FIG. 103b, as a transmission area 105.

Also, the source device 100 may determine one transmission area including all changed areas from among the full screen image 310a.

When a plurality of areas are changed in the full screen image 310a displayed on the screen of the source device 100, the source device 100 may set transmission areas that include the plurality of changed areas, respectively.

The source device 100 may extract, as change information, a pixel value of a transmission area. Also, the source device 100 may extract, as change information, the pixel value and a size of the transmission area, and ratio information about a ratio of the transmission area to an entire screen of the source device 100.

Referring back to FIG. 2, in operation S240 of the flowchart shown in FIG. 2, the source device 100 may encode the changed partial area of the image into a second streaming video, based on the change information.

The source device 100 may encode an image of the transmission area so as to control the image of the transmission area to be included in one frame, and thus may generate the second streaming video.

For example, when an image of one transmission area changes in real-time, the source device 100 may encode the image of the transmission area, which changes in real-time, and thus may generate a video.

Also, when an area, which has changed in the full screen image on the entire screen, varies in real-time, a transmission area may vary in real-time. Accordingly, the source device 100 may continuously encode an image of the transmission area that varies in real-time, and thus may generate a video.

When a plurality of areas change in the full screen image on the entire screen at a random time, the source device 100 may determine a plurality of transmission areas in the full screen image on the entire screen. Accordingly, the source device 100 may encode images of the transmission areas, respectively, and thus may generate videos, respectively.

When the source device 100 encodes an image of a transmission area and thus generates a frame, the source device 100 may generate display time information (e.g., a timestamp) or display order information about the frame. For example, the source device 100 may encode partial images so that the partial images that are extracted from the full screen image may have the same display time information. Thus, the partial images that are extracted from the full screen image may be displayed on the sync device 200 at the same time, so that the partial images in synchronization with each other may be displayed on a screen of the sync device 200.

The source device 100 may encode an image displayed in a transmission area into a video, based on a coordinate value and a size of the transmission area.

The source device 100 may encode the image into the video so that the video may have the same resolution as the number of pixels in horizontal and vertical directions of the transmission area or may have a resolution that is greater or less than a resolution of the transmission area.

The source device 100 may encode the image displayed in the transmission area, by using various encoding methods (e.g., H.264). Also, the source device 100 may encode the image displayed in the transmission area, with various resolutions, depending on sizes of the transmission area. Also, the source device 100 may encode a video with various frame rates, according to a speed by which the image displayed on the screen of the source device 100 has changed or according to a period by which the changed image is extracted. Also, the source device 100 may encode not only the image displayed on the screen of the source device 100 but may also encode sound that is output from the source device 100.

The source device 100 may divide the encoded image and sound into packets and perform multiplexing on the packets by using a transport stream protocol (e.g., an MPEG2 transport stream protocol).

In operation S250, the source device 100 may transmit the encoded second streaming video to the sync device 200.

The source device 100 may transmit the encoded second streaming video to the sync device 200 in a streaming manner (e.g., by using a real-time transport protocol).

Also, the source device 100 may transmit, to the sync device 200, coordinates information and size information about the transmission area, ratio information about the ratio of the transmission area to the entire screen of the source device 100, etc., in the form of metadata of the encoded video or as a separate session.

Also, the source device 100 may transmit control information for controlling streaming and information about the encoded audio and video to the sync device 200. For example, the source device 100 may request the sync device 200 to pause or resume at least one of the players that are executed by the sync device 200.

Figure 4:
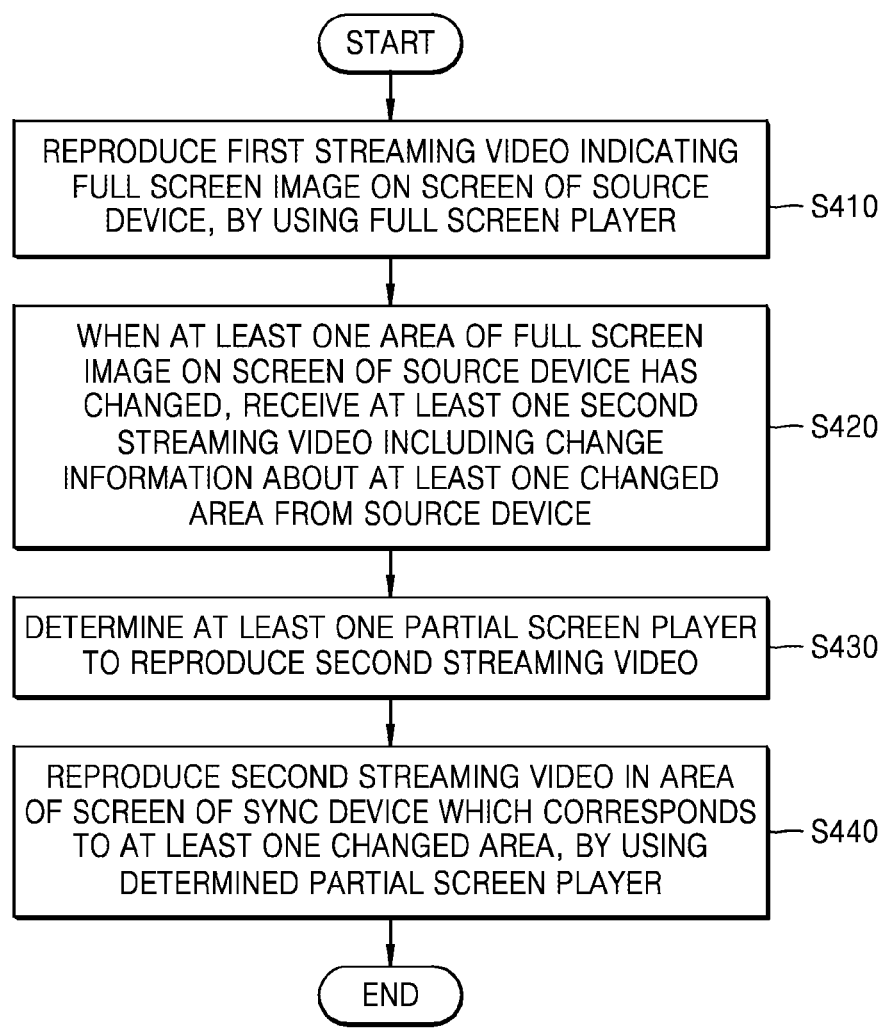
FIG. 4 is a flowchart of a method of receiving a video indicating/representing an image of a changed area from among all images displayed on a screen of a source device, and mirroring the screen of the source device according to an embodiment of the present disclosure.

FIG. 4 is a flowchart of a method of receiving a video indicating/representing an image of a changed area from among all images displayed on a screen of a source device, and mirroring the screen of the source device according to an embodiment of the present disclosure.

In operation S410, a sync device 200 may reproduce a first streaming video indicating/representing a full screen image on a screen of a source device 100, by using a full screen player.

The sync device 200 may receive, from the source device 100, the first streaming video indicating/representing the full screen image on the screen of the source device 100 and may reproduce the first streaming video on an entire screen or a partial screen of the sync device 200.

In operation S420, when at least one area of the full screen image on the screen of the source device 100 has changed, the sync device 200 may receive at least one second streaming video including change information about the at least one changed area from the source device 100.

The second streaming video may be encoded and generated so that an image of the at least one changed area is included in a frame.

For example, when an image of a transmission area changes in real-time, the image that changes in real-time in the transmission area may be encoded and thus may be generated as the second streaming video.

Also, when an area, which changes in the full screen image on the entire screen, varies in real-time, a transmission area may vary in real-time. Accordingly, images of the transmission area that vary in real-time may be encoded and thus may be generated as the second streaming video.

Also, when a plurality of areas are changed in the full screen image on the entire screen at a random time, the source device 100 may determine a plurality of transmission areas in the full screen image on the entire screen. Accordingly, images of the transmission areas may be encoded and thus may be generated as a plurality of second streaming videos, respectively.

Also, display time information or display order information may be set in the frame of the second streaming video. For example, frames indicating/representing partial images that are extracted from the full screen image may be encoded to have the same display time information. Thus, the partial images that are extracted from the full screen image may be displayed on the sync device 200 at the same time.

Also, the second streaming video may include the change information about the at least one changed area of the full screen image on the screen of the source device 100.

The change information may include information about a transmission area including the at least one changed area. The change information may include at least one of coordinate information and size information about the transmission area from among the full screen image on the screen of the source device 100, and ratio information about a ratio of the transmission area to the entire screen of the source device 100.

The sync device 200 may receive the change information in the form of metadata of the video from the source device 100.

The second streaming video may include data in which information about an image displayed in the transmission area from among all the mages on the screen of the source device 100, and audio information output from the source device 100 are encoded.

A resolution of the video may be equal to the number of pixels in horizontal and vertical directions of the transmission area or may be greater or less than a resolution of the transmission area. Each of the received video and audio may be data that is encoded by various encoding methods (e.g., H.264). Also, the received video may be the data that is encoded with various resolutions, depending on the size of the transmission area. Also, the received video may be the data that is encoded with various frame rates, according to a speed by which the image displayed on the screen of the source device 100 has changed or according to a period by which the changed image is extracted.

The second streaming video may be data that is obtained in a manner that encoded image and sound are divided into packets and multiplexing is performed on the packets by using a transport stream protocol (e.g., an MPEG2 transport stream protocol).

In operation S430, the sync device 200 may determine at least one partial screen player to reproduce the second streaming video.

The sync device 200 may determine an area of a screen of the sync device 200 which corresponds to the at least one changed area or the transmission area of the full screen image on the screen of the source device 100, based on the change information, and may determine a partial screen player to reproduce the second streaming video in the determined area of the screen.

For example, the sync device 200 may determine a position of a reproduction area of the full screen player which corresponds to the transmission area, based on the coordinate information about the transmission area, and the resolution (the number of pixels in horizontal and vertical directions) of the entire screen of the source device 100.

Also, the sync device 200 may determine the area of the screen of the sync device 200 which corresponds to the transmission area, based on the ratio information about the ratio of the transmission area to the entire screen of the source device 100.

The sync device 200 may select or generate at least one partial screen player to reproduce the second streaming video in the determined area of the screen.

For example, the sync device 200 may generate partial screen players according to the number of received videos. When the sync device 200 does not have a partial screen player to reproduce a video, the sync device 200 may load an object for the partial screen player to a memory of the sync device 200, and thus may generate the partial screen player.

The sync device 200 may preset partial screen players that correspond to transmission areas, respectively. Thus, the sync device 200 may select a partial screen player that corresponds to the transmission area of the received video, from among the partial screen players that are already included in the sync device 200.

When the sync device 200 selects at least one partial screen player, the sync device 200 may pause or stop the rest of the players in the sync device 200, except for the selected at least one selected partial screen player.

For example, while a full screen player in the sync device 200 receives and reproduces a full screen image that is displayed on the screen of the source device 100, if the sync device 200 receives a video including a changed area from the source device 100, then the sync device 200 may pause the full screen player and may select a partial screen player.

Also, while the partial screen player in the sync device 200 receives and reproduces the video including an image of the changed area from the source device 100, if the sync device 200 receives another video including a different transmission area from the source device 100, then the sync device 200 may stop the partial screen player and may select a partial screen player that corresponds to the different transmission area of the other video.

Also, the sync device 200 may receive a control signal from the source device 100 and thus may select, generate, pause, or stop a player.

For example, while the sync device 200 executes the full screen player, if the sync device 200 receives, from the source device 100, a request to pause the full screen player and a request to generate a partial screen player having a specific resolution, then the sync device 200 may pause the full screen player and may generate the partial screen player having the specific resolution.

Also, for example, while the sync device 200 executes the partial screen player, if the sync device 200 receives, from the source device 100, a request to stop the partial screen player and a request to resume the full screen player, then the sync device 200 may stop the partial screen player and may resume the full screen player.

In operation S440, the sync device 200 may reproduce the second streaming video in the area of the screen of the sync device 200 which corresponds to the at least one changed area, by using the determined partial screen player.

The selected partial screen player may reproduce the received video in the determined area of the screen of the sync device 200 which corresponds to the at least one changed area. Here, the full screen player has been paused, the full screen image displayed on the screen of the sync device 200 are not deleted, and only the transmission area from among the full screen image displayed on the screen of the sync device 200 may be changed.

When the sync device 200 receives, from the source device 100, images that are displayed in a plurality of transmission areas and are then encoded, the sync device 200 may select or generate a plurality of partial screen players for reproducing videos of the transmission areas, respectively, and the selected or generated partial screen players may simultaneously reproduce the encoded and received videos, respectively.

The sync device 200 may display frames on the screen, according to display timestamps that are set in a frame of the second streaming video. Thus, the frames of the videos having the same display timestamp may be simultaneously displayed on the full screen image displayed on the entire screen, by partial screen players that correspond to the frames, respectively.

While an image displayed on the screen of the sync device 200 is not deleted, only a changed area from among the image displayed on the screen of the sync device 200 is updated in the sync device 200, so that the image displayed on the screen of the sync device 200 may be mirrored to the sync device 200 without changing full screen image that are displayed on the screen of the sync device 200.

Figure 5:
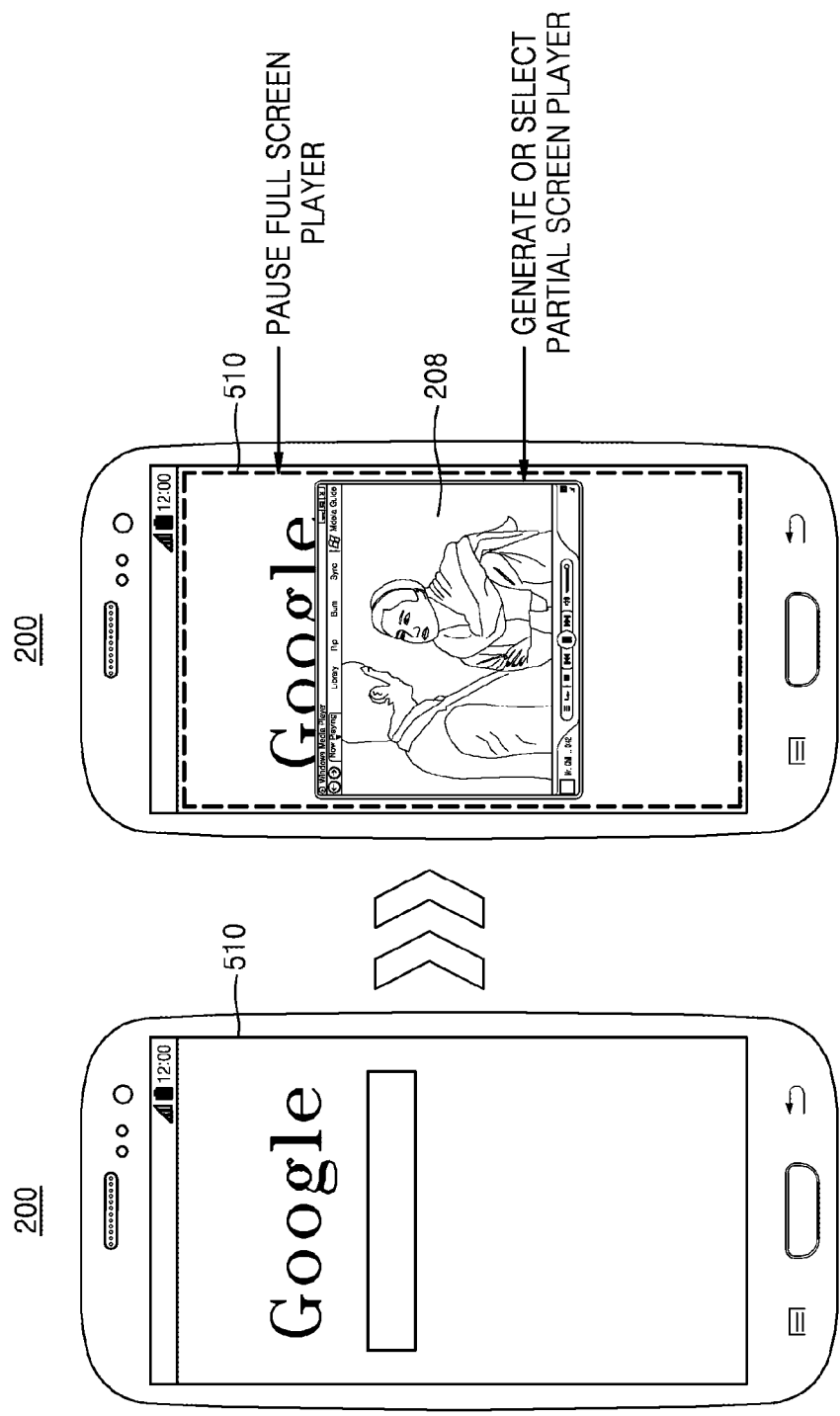
FIG. 5 illustrates an example in which a sync device receives a changed image from among all images displayed on a screen of a source device, and thus reproduces the changed image according to an embodiment of the present disclosure.

FIG. 5 illustrates an example in which a sync device receives a changed image from among all images displayed on a screen of a source device, and thus reproduces the changed image according to an embodiment of the present disclosure.

Referring to FIG. 5, a sync device 200 executes a full screen player, and thus receives and reproduces a full screen image 510 that is displayed on a screen of the source device 100 of FIG. 1.

When the sync device 200 receives, from the source device 100, the image indicating/representing a changed area in the full screen image 510 displayed on the screen of the source device 100, the sync device 200 may pause the full screen player, and may select or generate a partial screen player that corresponds to a transmission area of a received video including the image indicating/representing the changed area.

The selected or generated partial screen player may decode the received video, may not delete the full screen image 510 displayed on the screen of the source device 100, and may display a decoded video image 208 on a screen of the sync device 200 which corresponds to the transmission area.

When an image that is displayed on the screen of the source device 100 is a video as shown in FIG. 5, the sync device 200 may continuously receive a video to be displayed on the same transmission area, and the same partial screen player may continuously reproduce the received video.

Thus, the source device 100 may not have to transmit the full screen image 510 displayed on the screen of the source device 100, and the sync device 200 may not have to receive the full screen image 510, so that a transmission delay time, an encoding time, an amount of power consumption, and a size of transmission data may be decreased.

Figure 6:
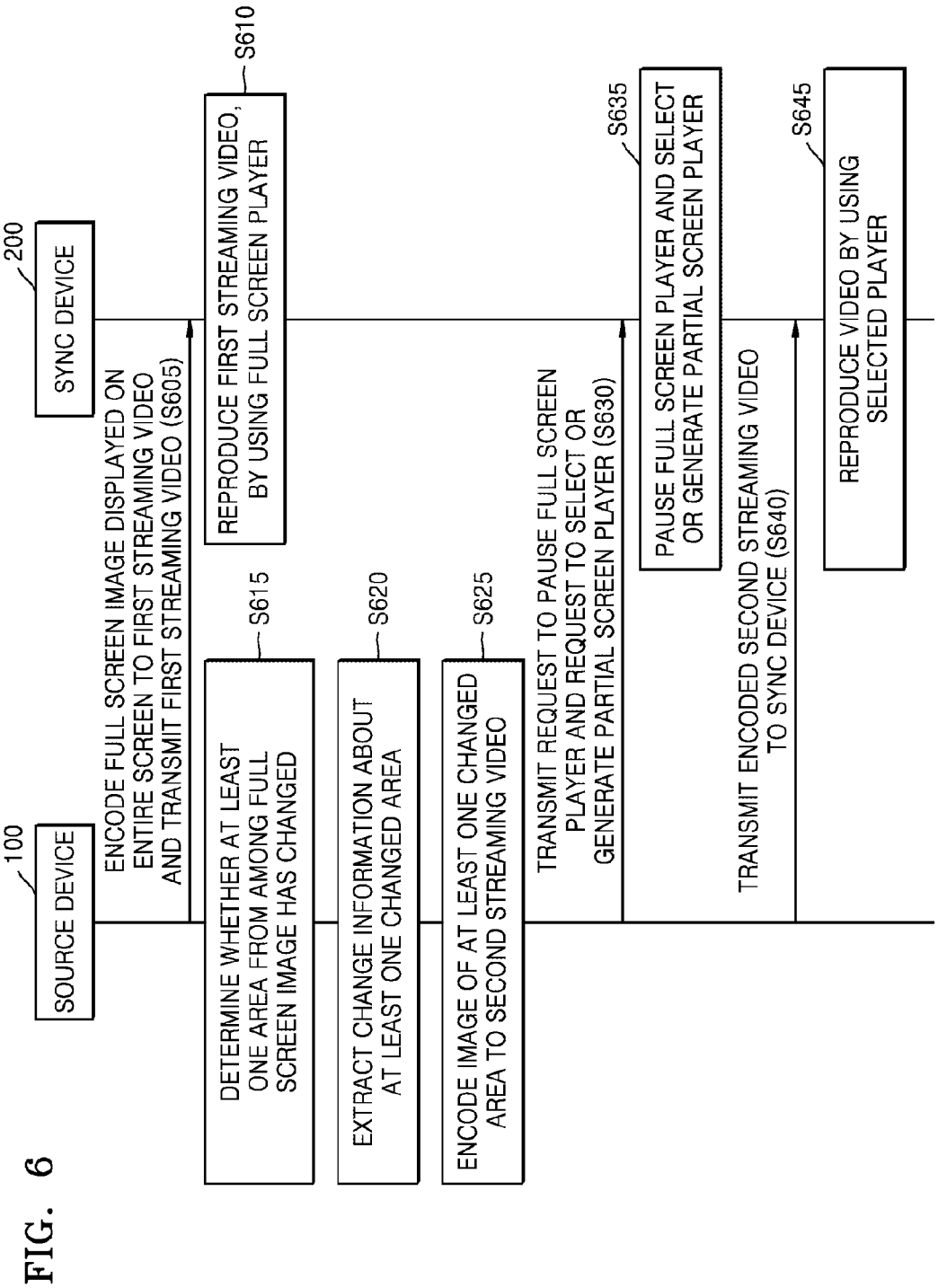
FIG. 6 is a flowchart of a method of receiving a control signal from a source device and thus controlling a player according to an embodiment of the present disclosure.

FIG. 6 is a flowchart of a method of receiving a control signal from a source device and thus controlling a player according to an embodiment of the present disclosure.

Referring to FIG. 6, in operation S605, a source device 100 may encode a full screen image that is displayed on an entire screen into a first streaming video and may transmit the first streaming video to a sync device 200. In operation S610, the sync device 200 may reproduce the first streaming video that is received from the source device 100, by using a full screen player.

In operation S615, the source device 100 may determine whether at least one area from among the full screen image displayed on the screen has changed. For example, the source device 100 may periodically compare the full screen image displayed on the screen with previous images, and thus may determine whether an image from among the full screen image has changed. Also, when an event occurs so that an image to be displayed on the screen is updated, the source device 100 may determine that an area from among the full screen image has changed.

In operation S620, the source device 100 may extract change information about the at least one changed area. For example, the source device 100 may extract, from among coordinate values of the full screen image on the screen, a coordinate value of the changed area in which a pixel value has changed. Also, the source device 100 may determine a transmission area including the at least one changed area of the full screen image on the screen of the source device 100, and may extract a pixel value in the transmission area.

In operation S625, the source device 100 may encode the image of the at least one changed area into a second streaming video, based on the change information. For example, the source device 100 may encode the image displayed in the transmission area into the second streaming video, based on the coordinate value and a size of the transmission area.

In operation S630, the source device 100 may transmit, to the sync device 200, a request to pause the full screen player and a request to select or generate a partial screen player.

When the transmission area including the changed image does not correspond to the entire screen, the source device 100 may transmit, to the sync device 200, the request to pause the full screen player that is currently executed by the sync device 200, and the request to select or generate the partial screen player that corresponds to the transmission area.

The source device 100 may transmit player control information and information about a player to be selected or generated. For example, the source device 100 may transmit information about a resolution of a video to be reproduced by the player to be selected or generated, information about the coordinate value and the size of the transmission area, and ratio information about a ratio of the transmission area to the entire screen of the source device 100.

The source device 100 may transmit the player control information via a session different from a video stream, and the player control information may be in the form of metadata of encoded video data.

In operation S635, the sync device 200 may pause the full screen player, and may select or generate the partial screen player to reproduce the video.

In operation S640, the source device 100 may transmit the encoded second streaming video to the sync device 200.

The second streaming video to be transmitted may be data obtained by dividing the encoded image and sound into packets and then performing multiplexing on the packets by using a transport stream protocol (e.g., an MPEG2 transport stream protocol).

The source device 100 may encode changed images of transmission areas into video streams, respectively, and may transmit the respective video streams to the sync device 200 via respective sessions or may transmit the video streams to the sync device 200 via one session.

In operation S645, the sync device 200 may reproduce the video by using the selected player.

The sync device 200 may select or generate players for the video streams, respectively, and may simultaneously reproduce the video streams.

The sync device 200 may determine a position and a size of an area of the screen of the sync device 200, where the video is to be displayed, based on the plurality of pieces of information about the transmission area, and may display the video at the determined position by using a selected player that corresponds to the video.

Figure 7:
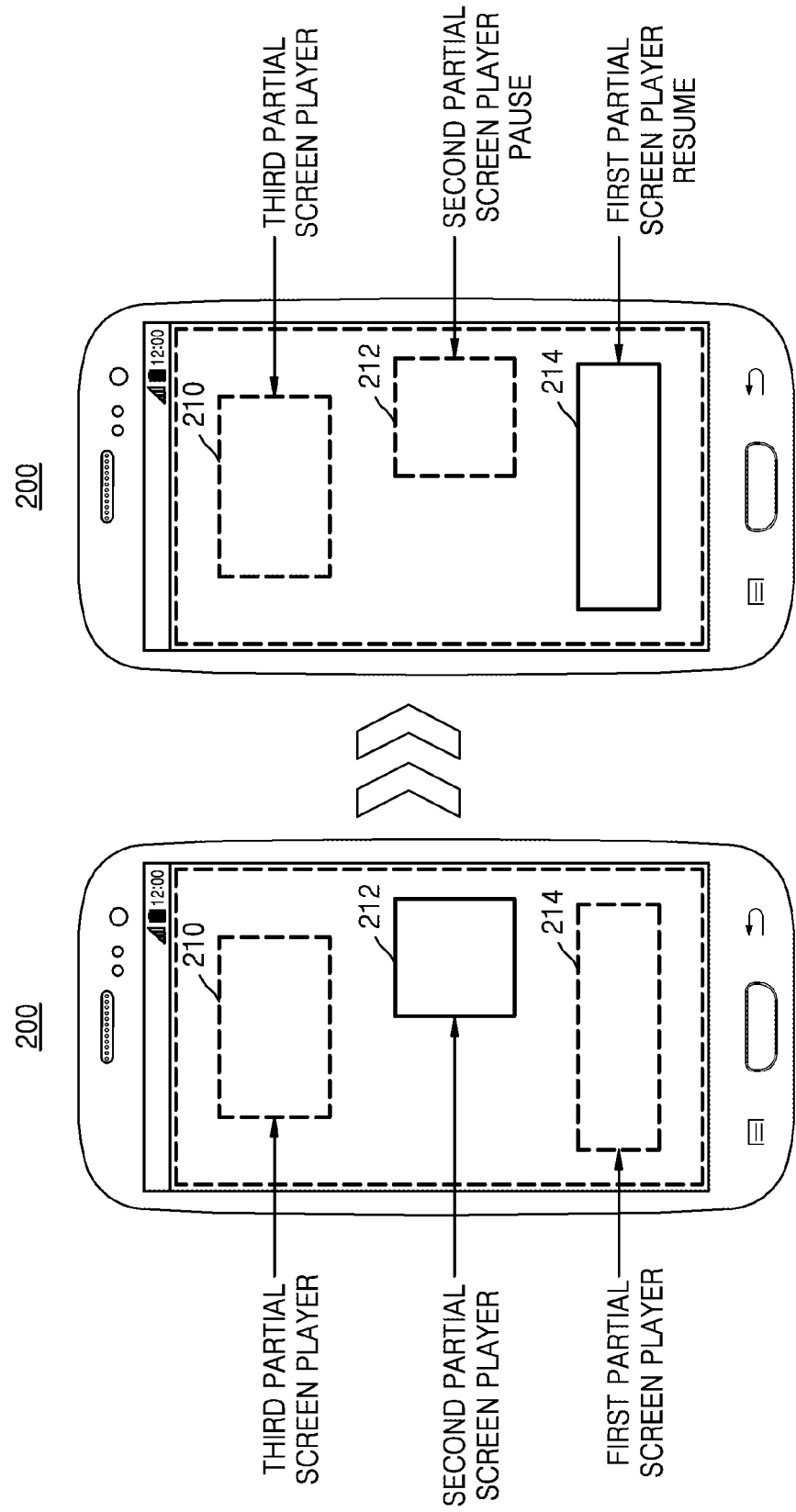
FIG. 7 illustrates an example in which a sync device receives an image that has changed from among all images on a screen of a source device and reproduces the image according to an embodiment of the present disclosure.

FIG. 7 illustrates an example in which a sync device receives an image that has changed from among all images on a screen of a source device and reproduces the image according to an embodiment of the present disclosure.

Referring to FIG. 7, a first partial screen player that displays a decoded image on a first area 214 of a screen of the sync device 200, and a third partial screen player that displays a decoded image on a third area 210 of the screen are paused, and a second partial screen player displays a video from the source device 100 of FIG. 1 on a second area 212.

When the sync device 200 receives, from the source device 100, an image that is displayed in a transmission area of the source device 100 which corresponds to the first area 214 of the screen of the sync device 200, the sync device 200 may pause or stop the second partial screen player, and may resume the first partial screen player, and thus, may reproduce a received video. The first partial screen player may decode data of the received video, and may display a decoded video image on the first area 214, based on information about the transmission area.

Figure 8:
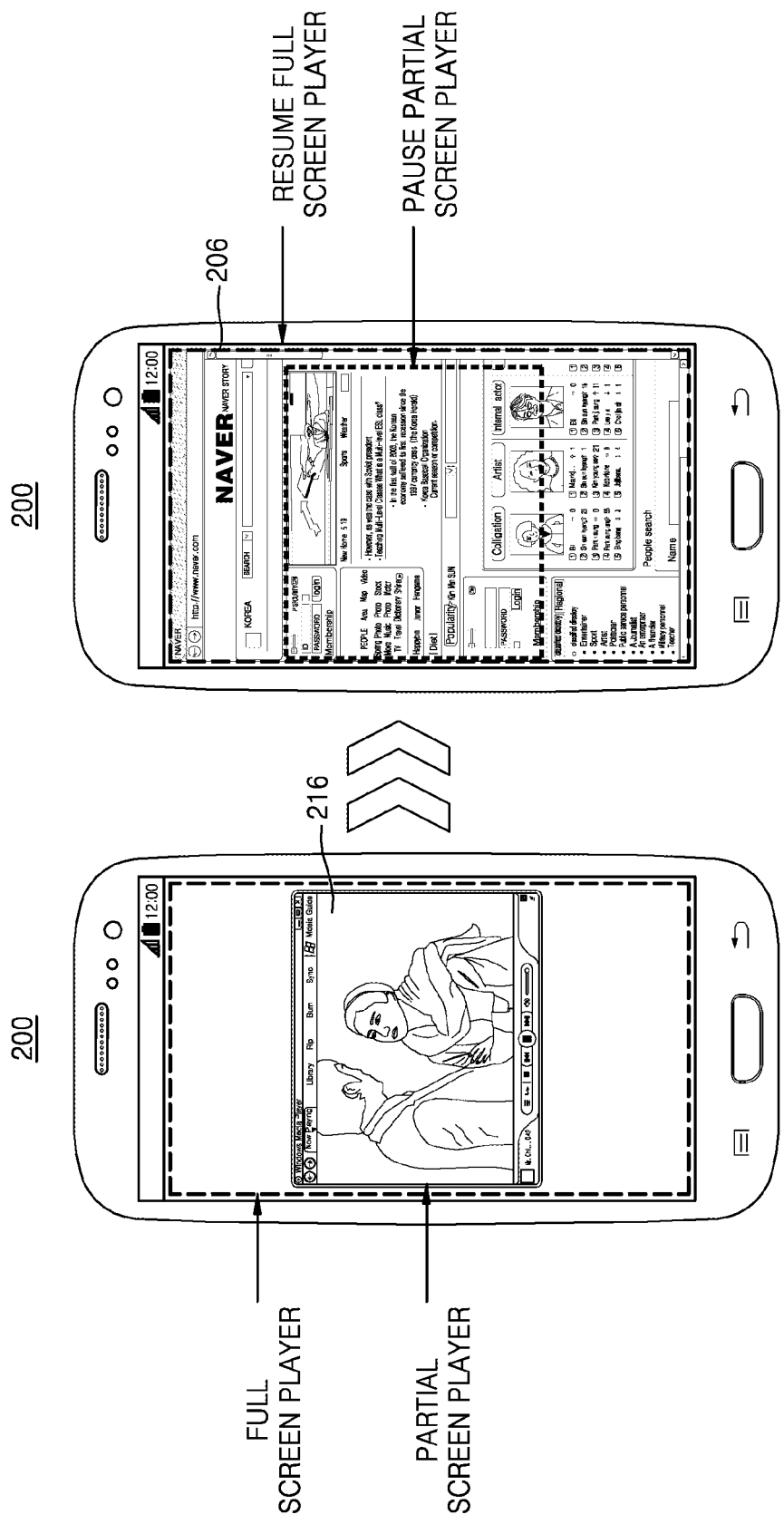
FIG. 8 illustrates an example in which a sync device receives an image that has changed from among all images on a screen of a source device and reproduces the image according to an embodiment of the present disclosure.

FIG. 8 illustrates an example in which a sync device receives an image that has changed from among all images on a screen of ta source device and reproduces the image according to an embodiment of the present disclosure.

Referring to FIG. 8, a full screen player is paused in a sync device 200, and a partial screen player decodes received video data and displays a decoded partial image 216 on a screen of the sync device 200.

When the sync device 200 receives, from the source device 100 of FIG. 1, a full screen image 206 that is displayed on a screen of the source device 100, the sync device 200 may pause the partial screen player and may resume the full screen player.

The resumed full screen player may decode received video data and may display the full screen image 206 on the screen of the source device 100, which is decoded, on the screen of the sync device 200.

Since the partial screen player is paused and the full screen image 206 are displayed in a reproduction area of the partial screen player, the partial image 216 that was displayed on the screen may not be shown to a user.

Figure 9:
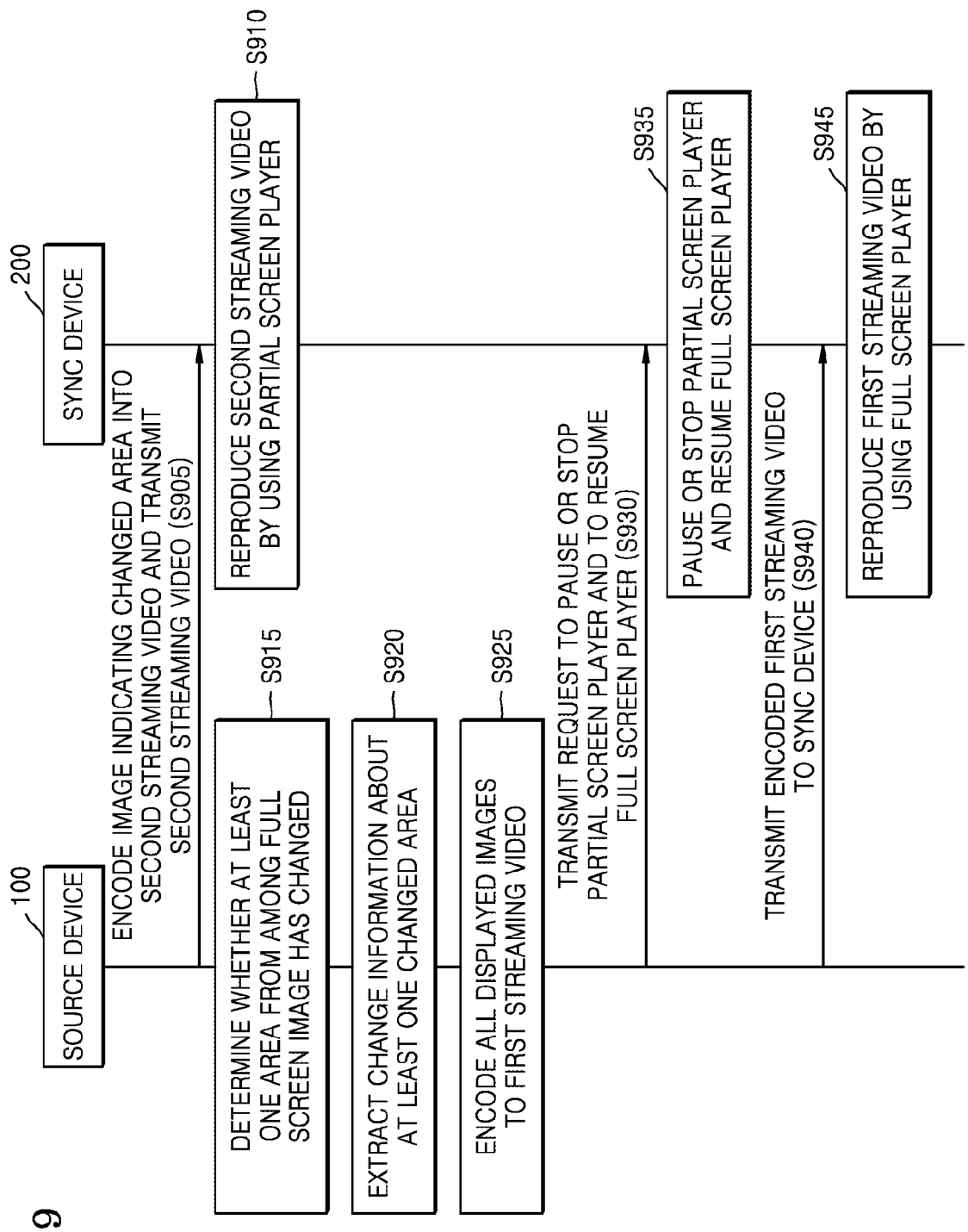
FIG. 9 is a flowchart of a method of receiving a control signal from a source device and thus controlling a player according to an embodiment of the present disclosure.

FIG. 9 is a flowchart of a method of receiving a control signal from a source device and thus controlling a player according to an embodiment of the present disclosure.

Referring to FIG. 9, in operation S905, a source device 100 may encode an image indicating/representing a changed area into a second streaming video and may transmit the second streaming video to a sync device 200. In operation S910, the sync device 200 may reproduce the second streaming video received from the source device 100, by using a partial screen player.

In operations S915, S920 and S925, the source device 100 may determine whether at least one area from among a full screen image displayed on a screen of the source device 100 has changed, may extract change information about the at least one changed area, and, when a transmission area including the at least one changed area corresponds to the full screen image displayed on the screen of the source device 100, the source device 100 may encode the full screen image (e.g., all displayed images) displayed on the screen into a first streaming video.

In operation S930, when the transmission area including the at least one changed area corresponds to the full screen image displayed on the screen of the source device 100, the source device 100 may transmit, to the sync device 200, a request to pause or stop a partial screen player and to resume a full screen player. In operation S935, the sync device 200 may pause or stop the partial screen player and may resume the full screen player.

In operation S940, the source device 100 may transmit the encoded first streaming video to the sync device 200. In operation S945, the sync device 200 may reproduce the first streaming video by using the full screen player.

Figure 10:
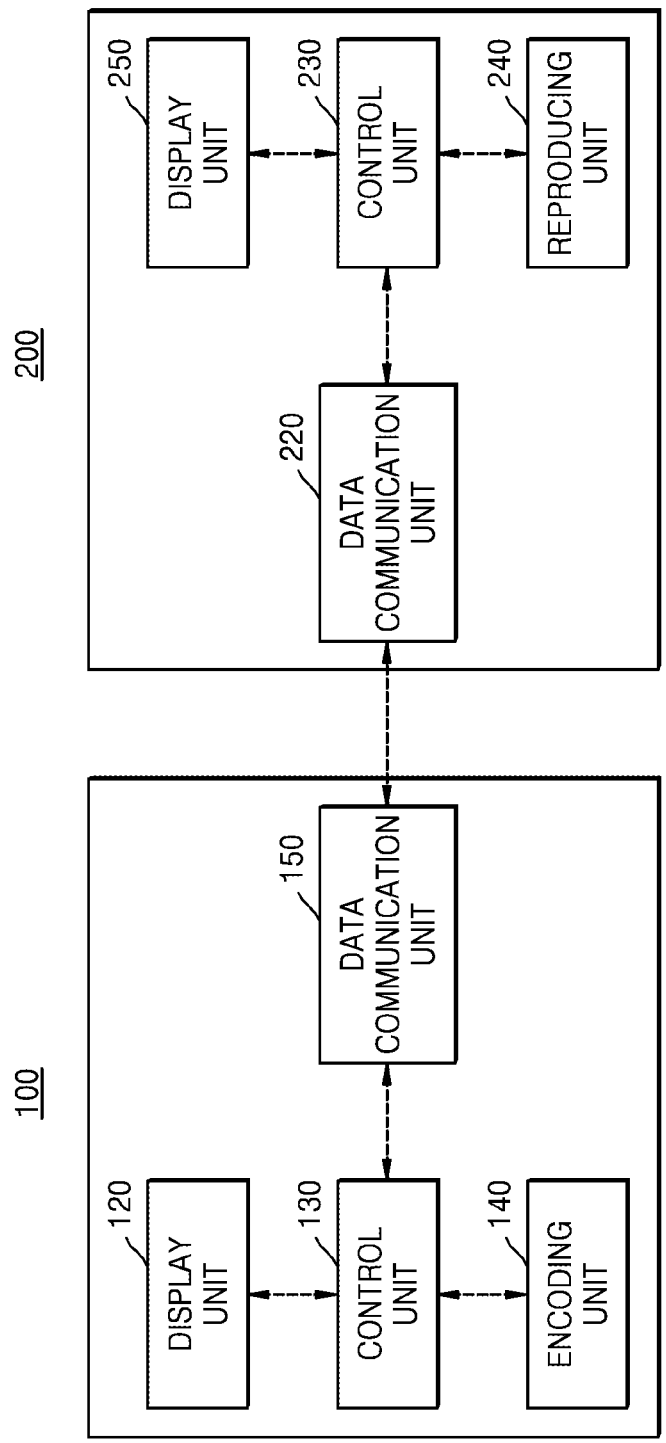
FIG. 10 illustrates block diagrams of a source device and a sync device according to an embodiment of the present disclosure.

FIG. 10 illustrates block diagrams of a source device and a sync device according to an embodiment of the present disclosure.

As illustrated in FIG. 10, a source device 100 may include a display unit 120, a control unit 130, an encoding unit 140, and a data communication unit 150. However, not all elements shown in FIG. 10 are necessary elements. That is, the source device 100 may be embodied with more or less elements than the elements shown in FIG. 10. For example, the source device 100 may further include a user input unit (not shown) and a storage unit (not shown), as well as the display unit 120, the control unit 130, the encoding unit 140, and the data communication unit 150.

The display unit 120 may be controlled by the control unit 130 and thus may display information that is processed by the source device 100.

When the display unit 120 and a touch pad form a mutual layer structure and thus are formed as a touch screen, the display unit 120 may be used as both an output device and input device. The display unit 120 may include at least one of a liquid crystal display (LCD), a thin film transistor-liquid crystal display (TFT-LCD), an organic light-emitting diode (OLED) display, a flexible display, a three-dimensional (3D) display, and an electrophoretic display.

The control unit 130 may control the display unit 120, the encoding unit 140, the data communication unit 150, the user input unit, and the storage unit.

Also, the control unit 130 may determine whether an area in full screen image displayed on a screen of the source device 100 has changed.

Also, the control unit 130 may periodically check the full screen image displayed on the screen with previous images, and thus may determine whether an image has changed. For example, the control unit 130 may periodically check pixel values of the full screen image displayed on the screen, and if the pixel values have changed, then the control unit 130 may determine that the full screen image have a changed image.

Also, when an event occurs so that an image to be displayed on the screen is updated, the control unit 130 may determine that the full screen image has a changed area.

The control unit 130 may extract change information about the changed image.

The control unit 130 may extract, from among coordinate values of the full screen image on the screen, a coordinate value of a changed area in which a pixel value has changed. For example, the control unit 130 may extract the full screen image displayed on the screen, may compare the full screen image with previously extracted full screen image, and thus may extract the coordinate value of the changed area in which the pixel value has changed.

Also, the control unit 130 may determine a transmission area from among the full screen image on the screen of the source device 100 which includes the changed image, and may extract a pixel value in the transmission area. Also, the control unit 130 may determine a transmission area from among the full screen image on the screen, wherein the transmission area includes the changed area in which the pixel value has changed.

The encoding unit 140 may encode a video indicating/representing the changed image, based on the change information.

For example, the encoding unit 140 may encode the full screen image into a first streaming video so that the full screen image displayed on the screen may be included in one frame. The encoding unit 140 may encode the full screen image displayed on the screen into a video by a preset time interval.

Also, the encoding unit 140 may encode the changed image of the transmission area so as to control the changed image to be included in one frame, and thus may generate a second streaming video.

For example, when an image of one transmission area changes in real-time, the encoding unit 140 may encode the image of the transmission area, which changes in real-time, and thus may generate a video.

Also, when an area, which changes in the full screen image on the screen of the source device 100, varies in real-time, a transmission area may vary in real-time. Accordingly, the encoding unit 140 may continuously encode an image of the transmission area that varies in real-time, and thus may generate a video.

When a plurality of areas are changed in the full screen image on the screen at a random time, the control unit 130 may determine a plurality of transmission areas in the full screen image on the screen. Accordingly, the control unit 130 may encode images of the transmission areas, respectively, and thus may generate videos, respectively Also, the encoding unit 140 may encode the image displayed in the transmission area, by using various encoding methods (e.g., H.264). Also, the encoding unit 140 may encode the image displayed in the transmission area, with various resolutions, depending on sizes of the transmission area. Also, the encoding unit 140 may encode the video with various frame rates, according to a speed by which the image displayed on the screen of the source device 100 has changed or according to a period by which the changed image is extracted. Also, the encoding unit 140 may encode not only the image displayed on the screen of the source device 100 but may also encode sound that is output from the source device 100.

The encoding unit 140 may divide the encoded image and sound into packets and perform multiplexing on the packets by using a transport stream protocol (e.g., an MPEG2 transport stream protocol).

The data communication unit 150 may transmit the encoded first streaming video and second streaming video to a sync device 200.

Accordingly, the data communication unit 150 may transmit the encoded video to the sync device 200 in a streaming manner (e.g., by using a real-time transport protocol).

Also, the data communication unit 150 may transmit control information for controlling streaming and information about the encoded audio and video to the sync device 200. For example, the data communication unit 150 may request the sync device 200 to pause or resume at least one of the players that are executed by the sync device 200.

The data communication unit 150 may include, but is not limited to, a short range communication unit that includes a Bluetooth communication unit, a Bluetooth Low Energy (BLE) communication unit, a Near Field Communication (NFC) unit, a Wi-Fi communication unit, a ZigBee communication unit, an infrared Data Association (IrDA) communication unit, a Wi-Fi Direct (WFD) communication unit, an ultra-wideband (UWB) communication unit, an Ant+ communication unit, or the like.

The data communication unit 150 exchanges a wireless signal with at least one of a base station, an external terminal, and a server on a mobile communication network. The wireless signal may include various types of data according to communication of a sound call signal, a video call signal, or a text/multimedia message.

The user input unit receives a user input of controlling the source device 100. For example, the user input unit may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezoelectric effect type touch pad, or the like), a jog wheel, a jog switch, etc.

The storage unit may store data for the source device 100 so as to transmit the changed image to the sync device 200.

As illustrated in FIG. 10, the sync device 200 may include a data communication unit 220, a control unit 230, a reproducing unit 240, and a display unit 250. However, not all elements shown in FIG. 10 are necessary elements. That is, the sync device 200 may be embodied with more or less elements than the elements shown in FIG. 10. For example, the sync device 200 may further include a user input unit (not shown) and a storage unit (not shown), as well as the data communication unit 220, the control unit 230, the reproducing unit 240, and the display unit 250.

The data communication unit 220 may exchange data about mirroring with the source device 100.

For example, the data communication unit 220 may receive a first video stream indicating/representing a full screen image on the screen of the source device 100, from the source device 100.

Also, when at least one area from among the full screen image on the screen of the source device 100 has changed, the data communication unit 220 may receive, from the source device 100, at least one second streaming video that includes change information about the at least one changed area.

Also, the data communication unit 220 may receive, from the source device 100, information about a transmission area including the at least one changed area. The information about the transmission area may include at least one of coordinate information and ratio information, wherein the coordinate information is about coordinates of the transmission area on the screen of the source device 100, and the ratio information is about a ratio of the transmission area to the entire screen of the source device 100.

Also, the data communication unit 220 may receive the information about the transmission area, in the form of metadata of the video, from the source device 100.

The data communication unit 220 may include, but is not limited to, a short range communication unit that includes a Bluetooth communication unit, a BLE communication unit, an NFC unit, a Wi-Fi communication unit, a ZigBee communication unit, an IrDA communication unit, a WFD communication unit, a UWB communication unit, an Ant+ communication unit, or the like.

The data communication unit 220 exchanges a wireless signal with at least one of a base station, an external terminal, and a server on a mobile communication network. The wireless signal may include various types of data according to a communication of a sound call signal, a video call signal, or a text/multimedia message.

The control unit 230 may control the data communication unit 220, the control unit 230, the reproducing unit 240, the display unit 250, the user input unit, and the storage unit.

Also, the control unit 230 may determine at least one partial screen player to reproduce the at least one second streaming video. For example, the control unit 230 may determine an area of the screen of the sync device 200 which corresponds to the transmission area, by using the coordinate information about the transmission area of the screen of the source device 100, and may determine a player to reproduce the at least one second streaming video in the determined area. Also, the control unit 230 may determine the player so that the at least one second streaming video may be reproduced in the sync device 200, based on a ratio equal to the ratio information about the transmission area with respect to the entire screen of the source device 100.

Also, when the player is selected, the control unit 230 may pause or stop the other players in the sync device 200, except for the selected player.

For example, while a full screen player of the sync device 200 receives and reproduces a video including the full screen image displayed on the screen of the source device 100, if a video including the at least one changed area is received from the source device 100, then the control unit 230 may pause the full screen player, and then may select a partial screen player and may reproduce the video including the at least one changed area.

Also, the control unit 230 may generate a player, based on information about the transmission area. For example, the control unit 230 may generate the player to reproduce the video in the area of the screen of the sync device 200 which corresponds to the transmission area, by using the coordinate information about the transmission area of the screen of the source device 100. Also, the control unit 230 may generate the player so that the video may be reproduced in the sync device 200, based on the ratio equal to the ratio information about the transmission area with respect to the entire screen of the source device 100.

Also, when the control unit 230 generates the player, the control unit 230 may control the other players, which are executed by the sync device 200, to be paused or stopped.

For example, while the full screen player is executed, if the video including the at least one changed area is received from the source device 100, then the control unit 230 may pause the full screen player, and then may generate a partial screen player and may reproduce the video including the at least one changed area.

In the present embodiment, the control unit 230 may receive a control signal from the source device 100 and thus may select, generate, pause, or stop at least one player.

Also, for example, while the control unit 230 executes the partial screen player, if the control unit 230 receives, from the source device 100, a request to stop the partial screen player and a request to resume the full screen player, then the control unit 230 may control the partial screen player to be stopped and may control the full screen player to be resumed.

The reproducing unit 240 may reproduce the video by using the selected player.

The reproducing unit 240 may determine a position and a size of an area where a reproduction image of the selected player is to be displayed and may display the reproduction image of the selected player in the area at the determined position.

The display unit 250 may be controlled by the control unit 230 and thus may display information that is processed by the sync device 200.

When the display unit 250 and a touch pad form a mutual layer structure and thus are formed as a touch screen, the display unit 120 may be used as both an output device and input device. The display unit 120 may include at least one of an LCD, a TFT-LCD, an OLED display, a flexible display, a 3D display, and an electrophoretic display.

The user input unit receives a user input of controlling the sync device 200. For example, the user input unit may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezoelectric effect type touch pad, or the like), a jog wheel, and a jog switch, etc.

The storage unit may store data for the sync device 200 to receive an image displayed on the screen of the source device 100 and then to display the image.

The one or more embodiments of the present disclosure may be embodied as a non-transitory computer-readable recording medium, e.g., a program module to be executed in computers, which includes computer-readable commands. The computer-readable recording medium may include any usable medium that may be accessed by computers, volatile and non-volatile media, and detachable and non-detachable media. Also, the computer-readable recording medium may include a computer storage medium and a communication medium. The computer storage medium includes all of volatile and non-volatile media, and detachable and non-detachable media which are designed to store information including computer-readable commands, data structures, program modules, or other data. The communication medium includes computer-readable commands, a data structure, a program module, and other transmission mechanisms, and includes other information transmission mediums.

It should be understood that the embodiments described herein should be considered in a descriptive sense only and not for purposes of limitation. Descriptions of features or aspects within each embodiment should typically be considered as available for other similar features or aspects in other embodiments. For example, configuring elements that are singular forms may be executed in a distributed fashion, and also, configuring elements that are distributed may be combined and then executed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of reproducing a streaming video received from a source device, the method comprising:
    reproducing, by a sync device, a first streaming video representing an image on a screen of the source device, the first streaming video being reproduced using a full screen player;
    when a partial area of the image on the screen of the source device changes, receiving, from the source device, a second streaming video comprising change information about the partial area, and pausing the full screen player by displaying an image of the full screen player at a moment before the pausing;

determining a partial screen player to reproduce the second streaming video; and reproducing the second streaming video in an area of a screen of the sync device which corresponds to the partial area of the image on the screen of the source device, wherein the second streaming video is reproduced using the partial screen player and wherein the image of the full screen player at the moment before the pausing is displayed on the screen of the sync device.

2. The method of claim 1, wherein, when a plurality of areas of the image on the screen of the source device change, the determining of the partial screen player comprises determining a plurality of partial screen players.

3. The method of claim 1, wherein the change information of the second streaming video is received from the source device in a form of metadata.

4. The method of claim 1, wherein the reproducing of the second streaming video comprises determining, based on the change information, a position and a size of an area of the screen of the sync device where a reproduction image of the partial screen player is to be displayed.

5. The method of claim 1, wherein the reproducing of the second streaming video further comprises one of pausing or stopping other players from among players executed by the sync device, except for the partial screen player.

6. The method of claim 1, wherein the reproducing of the second streaming video further comprises:

receiving, from the source device, a request to pause the partial screen player;

pausing the partial screen player;

receiving, from the source device, a request to resume the full screen player; and resuming the full screen player.

7. A non-transitory computer-readable recording medium having a program recorded thereon, the program causing a computer to execute the method of claim 1.

8. A method of transmitting a streaming video to a sync device, the method comprising:

transmitting, by a source device, a first streaming video representing an image displayed on a screen of the source device, the first streaming video being transmitted to the sync device;

determining whether a partial area of the image displayed on the screen of the source device has changed;

extracting change information about the changed partial area;

encoding the partial area of the image into a second streaming video, based on the change information;

transmitting the second streaming video to the sync device; and stopping the transmitting of the first streaming video to the sync device, wherein the second streaming video is reproduced, by the sync device, in an area of a screen of the sync device which corresponds to the partial area of the image on the screen of the source device, and wherein the screen of the sync device displays an image of the first streaming video at a moment before the stopping transmitting the first streaming video.

9. The method of claim 8, wherein the extracting of the change information comprises determining a transmission area comprising the changed partial area, and extracting a pixel value of the transmission area.

10. A sync device for reproducing a streaming video received from a source device, the sync device comprising:

a memory configured to store thereon instructions;

at least one processor executing the instructions being configured to reproduce a first streaming video representing an image on a screen of the source device, the first streaming video being reproduced using a full screen player; and a communication interface configured to, when a partial area of the image on the screen of the source device changes, receive, from the source device, a second streaming video comprising change information about the partial area;

wherein the at least one processor is further configured to:

pause the full screen player by displaying an image of the full screen player at a moment before the pausing, determine a partial screen player to reproduce the second streaming video, and reproduce the second streaming video in an area of a screen of the sync device which corresponds to the partial area of the image on the screen of the source device, the second streaming video being reproduced using the partial screen player, and wherein the image of the full screen player at the moment before the pausing is displayed on the screen of the sync device.

11. The sync device of claim 10, wherein, when a plurality of areas of the image on the screen of the source device change, the at least one processor is further configured to determine a plurality of partial screen players.

12. The sync device of claim 10, wherein the change information of the second streaming video is received from the source device in a form of metadata.

13. The sync device of claim 10, wherein the at least one processor is further configured to determine, based on the change information, a position and a size of an area of the screen of the sync device where a reproduction image of the partial screen player is to be displayed.

14. The sync device of claim 10, wherein the data communication interface is further configured to receive, from the source device, a request to pause the full screen player.

15. The sync device of claim 14, wherein the data communication interface is further configured to receive, from the source device, a request to pause the partial screen player and a request to resume the full screen player, and wherein the at least one processor is further configured to pause the partial screen player and resume the full screen player based on the received request to pause the partial screen player and the received request to resume the full screen player.

16. A source device for transmitting a streaming video to a sync device, the source device comprising:

a data communication interface configured to transmit a first streaming video representing an image displayed on a screen of the source device, the first streaming video being transmitted to the sync device;

at least one processor configured to:

determine whether a partial area of the image displayed on the screen of the source device has changed and to extract change information about the changed partial area, and encode the partial area of the image into a second streaming video, based on the change information, wherein the data communication interface is further configured to transmit the second streaming video to the sync device, wherein the at least one processor is further configured to stop the transmitting of the first streaming video to the sync device, wherein the second streaming video is reproduced, by the sync device, in an area of a screen of the sync device which corresponds to the partial area of the image on the screen of the source device, and wherein the screen of the sync device displays an image of the first streaming video at a moment before the stopping transmitting the first streaming video.

17. The source device of claim 16, wherein the at least one processor is further configured to:

determine a transmission area comprising the changed partial area, and extract a pixel value of the transmission area.

18. The source device of claim 16, wherein the at least one processor is further configured to transmit, to the sync device, one of a request to pause or a request to resume at least one player from among players that are executed by the sync device.

\* \* \* \* \*